United States Patent [19]

Szwerc

[11] Patent Number: 4,844,919
[45] Date of Patent: Jul. 4, 1989

[54] CONCAVE SHAPED SNACK FOOD AND PROCESS FOR PREPARING SAME

[75] Inventor: Joe Szwerc, Mahwah, N.J.

[73] Assignee: Nabisco Brands, Inc., Parsippany, N.J.

[21] Appl. No.: 72,376

[22] Filed: Jul. 13, 1987

[51] Int. Cl.$^4$ ............................................... A23P 1/08
[52] U.S. Cl. .................................... 426/94; 426/290; 426/296; 426/549
[58] Field of Search ................. 426/94, 289, 296, 302, 426/549, 290

[56] References Cited

U.S. PATENT DOCUMENTS

| | | | |
|---|---|---|---|
| Re. 31,819 | 1/1985 | Weiss et al. | 426/439 |
| 2,067,682 | 1/1937 | Romney | 426/290 |
| 3,184,318 | 5/1965 | McCadam | 426/582 |
| 3,250,627 | 5/1966 | Thelan | 426/94 |
| 3,576,647 | 10/1967 | Liepa | 99/100 |
| 4,520,034 | 5/1985 | Ishii et al. | 426/290 |
| 4,563,358 | 1/1986 | Mercer et al. | 426/89 |
| 4,609,555 | 9/1986 | Becher et al. | 426/549 |

FOREIGN PATENT DOCUMENTS 0193027 2/1986 European Pat. Off. .
2172185 3/1986 European Pat. Off. .

OTHER PUBLICATIONS

Bulletin #113 "Film-Set" by National Starch, Bridgewater, N.J.
"National's Exploration of Starch, as a Dry Granule or Powder, as a Swollen Granule, as a Molecule in Solution, as a Film or Binder" by National Starch, Bridgewater, N.J.

Primary Examiner—Donald E. Czaja
Assistant Examiner—Mary S. Mims
Attorney, Agent, or Firm—Richard Kornutik

[57] ABSTRACT

Disclosed is a concave shaped baked snack product coated with a particulate topping composition and a process for preparing it. The topping composition is made from a film-forming food starch and flavors and is applied to a sheeted dough prior to baking. During baking the topping composition becomes fused to the expanding dough base causing the edges of the dough sheet to lift up resulting in a desirable concave shaped coated snack product.

50 Claims, 1 Drawing Sheet

CONCAVE SHAPED SNACK FOOD AND PROCESS FOR PREPARING SAME

BACKGROUND OF THE INVENTION

The present invention relates generally to baked snack products and to processes for preparing such snack products. More particularly, the present invention relates to a concave shaped snack product coated with a fused particulate topping composition.

Studies of consumer preferences have repeatedly shown that consumers desire flavor, texture, and shape variety in food products, particularly snack products such as crackers or potato chips.

One product which does not appear on the market is a concave shaped, baked, cracker-type snack product coated with a fused particulate topping composition.

It has been common practice, where possible, in the production of snack products such as potato chips or corn chips to impart a curved shape to the product. The curved shape is considered a desirable feature both from a visual aspect and from the fact that it facilitates use of the snack with dips since the curved shape makes it easier to collect and maintain the dip on the surface of the snack. Furthermore the curved shape of the snack results in a lower bulk density in the packaging giving the packaged product a pleasantly filled appearance. Generally a curved shape is imparted as a by product of the manufacturing process. For example U.S. Pat. No. 3,576,647 to Liepa teaches that in making potato chips, slices of raw potatoes are deep fat fried to a crisp state. The chips so prepared have a random surface curvature which usually takes on a saddle-like appearance. However, frying is the only acceptable means of producing the curve shaped product described and the chips are prepared not from doughs but whole slices of potato. The curled shape present in corn chips is the result of using a pressurized extrusion process. The curl forms as the product exits the extrusion head. The use of extrusion equipment, however, limits the type of flours which may be used to make up the dough since some, such as wheat flours, tend to burn under the temperatures found in an extrusion chamber. Furthermore a draw back to both of the products described is that they are produced by deep fat frying. Deep fat fried food products are often shunned or avoided by members of the public desiring to lower their total fat and oil intake.

Mechanical means are also used to impart a curved shape to flat snack products. The art provides numerous examples of snack products which have to be shaped by mechanical means. Among these is U.S. Pat. No. Re. 31,819 to Weir et. al., which describes an apparatus for preparing fabricated potato chips from a flat dough ribbon, in which if a curved shape is desired, the flat dough ribbon is molded between concave and convex surfaces directly after the frying step to produce the desired shape. U.S. Pat. No. 3,576,647 to Liepa teaches a method for preparing a saddle shaped fabricated potato chip by sheeting and cutting the desired shape from the dough and then holding the dough piece between two similarly configured molds as the dough piece is conveyed through the deep fat frying step to ensure that the piece maintains its deformed shape.

One means for imparting a concave shape to a oven baked cracker-type snack product is to replace the normal flat band of a commercial oven with a specially fabricated band that has spaced ridges affixed to the band such that when the dough sheet is layed onto it, gravity pulls the unsupported middle of the dough sheet down resulting in a desirable concave shape. This is not a commercially desirable method since it requires a specially fabricated oven band which would have to be replaced with a flat band whenever the manufacturer wished to make other products without a curved shape. The manufacturer would end up with one oven dedicated to production of concave shape baked products, thus limiting his production flexibility. Furthermore the concave shape is limited to one fixed angle since the ridges are not adjustable. Generally it is also known in the art that a slight curvature can be imparted to a dough sheet being subjected to oven baking by varying the heat applied in the top and bottom zone of the band oven. For example, in manufacturing a thin wheat type cracker by applying greater heat to the dough sheet in the top zone and less heat in the bottom zone, the middle portion of the product will lift off the band to give a very slight convex shape. However the curvature which may be imparted to the product using this technique is slight, certainly less than 10 degrees. Furthermore the product produced tends to be non-uniform since it is difficult to control the amount of curvature which is imparted to the product using this baking method.

The application of flavored topping compositions is also carried out generally after the baking or frying step of the process by using application techniques such as spraying or dipping.

It is highly desirable that the coating which is applied to the snack product be tightly affixed or fused to the snack; otherwise the flavor coating comes off while being subjected to further handling both before and after packaging thus making the product more expensive to flavor. There is an economical advantage to being able to affix the flavorants in the prebaking stage since here it is easier to collect unused flavor and recycle for reuse. U.S. Pat. No. 4,609,555 to Becher et. al., teaches the preparation of a flavoring composition for topical, pre-bake application to baked dough products. The examples discloses applying dry particles to a unbaked dough preform, the flavor composition being a mixture of flavoring and seasoning ingredients, cracker flour, comminuted baked dough products, and fats. However, the particles are not applied with the intent of forming a continuous coating, but rather as discrete particles. Furthermore, the patent teaches that it is the melting of the fats which causes the particles to adhere to the surfaces of the baked product after cooling. In addition, there is no discussion that the coating applied has any impact on deforming the shape of snack product.

The present invention provides a concave shaped baked snack product which is coated with a fused flavored particulate topping and the product can be made on existing, in-place commercial manufacturing equipment. The topping composition is made from a film-forming food starch and flavors and is applied to a sheeted dough prior to baking. During baking the topping composition becomes fused to the expanding dough base causing the edges of the dough sheet to lift up resulting in a desirable concave shaped coated snack product.

SUMMARY OF THE INVENTION

It is an object of the present invention to provide a concave shaped snack food with a particulate topping composition and a process for preparing it.

It is another object of the present invention to provide dough coated with a flavored particulate topping which upon baking yields a concave shaped snack food and a process for preparing it.

It is a more specific object of the present invention to provide a substantially flat "cracker type" dough base coated with a substantially continuous, flavored particulate topping composition containing a film-forming food starch which upon baking fuses to the dough base causing a concave shaped snack food to be formed and a process for preparing it.

These and other objects are achieved according to at least the preferred embodiments of the present invention which provide a concave shaped snack food coated with a particulate topping composition and a process for preparing it. The snack food in its broadest aspects can be described as being made from a dough base which has been coated on the one surface with a particulate topping composition, which upon baking yields a concave shaped snack food coated with a fused, substantially continuous topping wherein the dough base comprises a flour mixture, shortening, and water; and the topping composition comprises a film-forming food starch and a flavor component.

The process according to the invention in its broadest aspects comprises preparing a particulate topping composition by blending a film-forming food starch and a flavor component; preparing a dough base by blending a flour mixture, shortening, and water to form a dough; sheeting the dough; coating the sheeted dough with the blended topping composition; baking the coated dough base at a high enough temperature and for a sufficient time period such that the coated topping composition fuses to the dough base causing the flat dough base to deform into a concave shaped snack product.

The baked product so formed is useful where a concave shaped snack food is desired in which the particulate topping composition has been fused to the dough base during the baking operation. It is particularly useful for forming coated curve shaped crackers in which the problems associated with deforming by mechanical means are avoided.

BRIEF DESCRIPTION OF THE DRAWING

The invention will be better understood and its advantages will be more apparent when the following detailed description is read in light of the accompanying figures.

DETAILED DESCRIPTION OF THE INVENTION

Disclosed is a concave shaped baked snack product coated with a particulate topping composition and a process for preparing it. The topping composition is made from a film-forming food starch and a flavor component and is applied to a sheeted dough prior to baking. During baking the topping composition becomes fused to the dough base and due to different expansion rates causes the edges of the dough sheet to lift up, resulting in a desirable concave shaped product.

For purposes of this invention, a baked snack product refers to either a biscuit, cracker or chip-type snack product without particular reference to the type or presence of leavening agents. In a preferred embodiment, a flavored topping composition containing a film-forming starch is applied to a substantially flat "cracker-type" dough sheet which has been cut in a rectangular shape and which upon baking yields a concave shaped cracker with a tightly fused coating.

The present invention has the advantage of providing a snack product wherein the typical coating does become substantially fused to the dough base during the baking step, thus significantly reducing the loss of flavorants due to product handling after baking.

While not wishing to be bound to any particular theory, evidence indicates that the controlled deforming occurs as the result of a so-called bimetallic effect. Upon coating the dough base with a substantially dry particulate starch composition, the higher moisture in the dough base begins to migrate to the starch coating hydrating it as the sheeted product enters the oven. The hydration combined with the oven heat causes the starch to gelatinize into a film-forming matrix. The film so formed significantly inhibits moisture loss through the upper surface of the dough sheet. However, moisture continues to be driven from the sides and the lower surface. This evaporation acts as a leavening agent causing the dough base to expand at a much more rapid rate and extent than the fused starch based topping composition which acts to constrict the expansion on the horizontal plane of the dough base. This results in the edges of the dough sheet lifting off the oven band surface resulting in a desirable concave shaped snack food.

A variety of shapes may be cut from the dough sheet depending on the design desired. Examples of acceptable shapes are oval, which, when deformed, will result in a traditional arc shaped potato chip type product. Other acceptable designs would be triangles and various four sided geometric shapes such as squares or rectangles.

Figure 1:
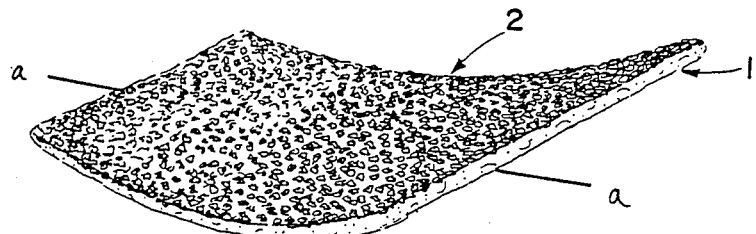
FIG. 1 shows an enlarged perspective view of a preferred embodiment of the snack product described in this invention.
Figure 2:
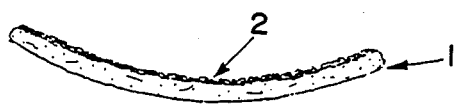
FIG. 2 shows an enlarged profile view taken along line a—a in FIG. 1.

A preferred embodiment of the present invention is shown in FIGS. 1 and 2. Shown is a curve shaped rectangular cracker-type snack (1), which has been coated with a fused, substantially continuous particulate flavored topping composition (2). By substantially continuous, we mean that the coating composition covers the upper surface of the dough base without significant breaks in the coating. This is to be distinguished from particulate toppings such as described in U.S. Pat. No. 4,609,555 to Becher et. al. which describes a topping composition which is substantially discontinuous and relies upon the fats present in the topping and their melting to affix itself to the dough.

Sufficient topping must be applied such that when subjected to baking, the coating forms a barrier to loss of moisture from the upper surface of the dough sheet and as the dough base expands, sufficient resistance is present in the coating to cause the desired deformation to take place. The dough base after baking will have a thickness (1) of from about 0.05 mm to about 3.0 mm. Further the toppings thickness (2) may vary from a thickness of from about 0.005 mm to about 1 mm, with a preferred thickness of from about 0.01 mm to about 0.6 mm, although it is contemplated that occasional particles of topping may be present which exceed significantly the rest of the coating thickness.

Figure 3:
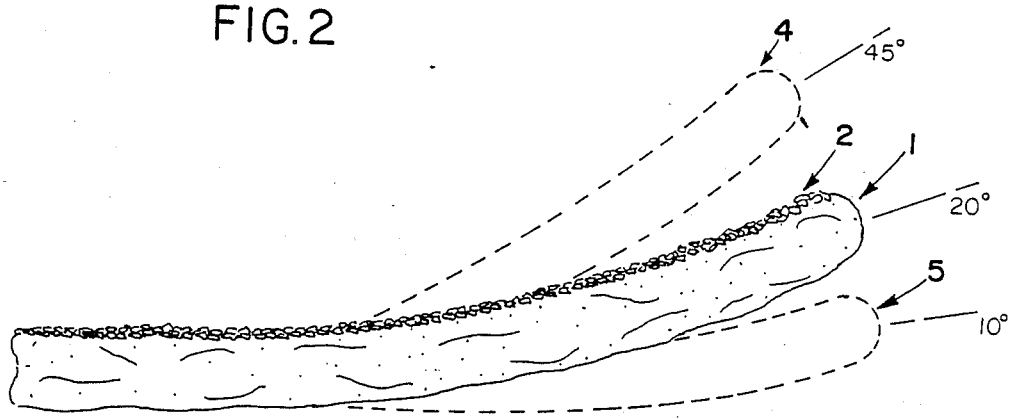
FIG. 3 shows a enlarged view of the profile taken along line a—a in FIG. 1.

The degree of curvature will also vary depending on a number of variables, including, but not limited to, the amount of expansion which takes place in the dough base and/or the strength of the film formed. It is contemplated that the curvature will range from 10 degrees as shown in (5) in FIG. 3 to about 45 degrees as shown by (4) in FIG. 3. A preferred curvature range would be from about 15 degrees to about 35 degrees. The preferred product shown in FIG. 2 has a degree of curvature of about 22 degrees. The final product does not have to be subjected to further drying and will typically have a moisture content of about 1.5% to about 6%, with a preferred final moisture of from about 3% to about 5%.

The process generally entails blending flavoring components with a film-forming starch to form a substantially dry particulated coating composition which is applied to a sheet dough base made from a flour mixture and water. The coated dough base is then baked to form a coated, concave shaped snack product.

By film-forming food starch we mean a starch product which upon hydration and gelatinization will form a film which is capable of bonding to the underlying dough base and the other ingredients present in the coating. This starch will be further characterized by its tendency to set quickly enough such that, while still in the baking process and prior to significant expansion of the dough base, it becomes sufficiently formed to provide a barrier to the evaporating moisture in the dough base. Starches from different sources such as potato, corn, tapioca and rice may be used and they may have been subjected to modification, or be in a raw state. It is also contemplated that one particular food starch or mixtures of food starches may be used. A preferred group of starches for use in the topping composition are those prepared from corn and even moe preferred group of starches are those prepared from waxy maize corn wherein the starch has been subjected to some modification to enhance its film forming characteristics.

A suitable film-forming starch for use in the practice of the invention is commercially available under the name "FILM-SET" (National Starch Corp., Bridgewater, N.J.). This material is described by the manufacturer as a low viscosity modified food starch with excellent film forming characteristics. It has a pH of approximately 6.0 and moisture of about 11%.

The amount of starch used in the topping composition may vary significantly depending upon the amount of curvature desired, the make up of the flavor component and the bonding and the film-forming strength of the starch selected. It will also depend on a lesser extent on the amount of moisture present in the dough base. Typically from about 5% to about 40% by weight of the film forming food starch will be present in the topping component. Preferably the film forming starch is present in about 15% to about 30% based upon the total weight of the topping composition. A typical topping composition will contain about 20% by weight of the film forming food starch.

The types of flavors, seasoning and species which may be used in the flavoring composition are broad and only limited by their sensory compatibility with other ingredients in the snack product. It is also important that they do not impart an undesirable texture to the final snack. The flavoring agents may be in solid or liquid form and may be fat soluble or water soluble. One can mention as merely illustrative of flavoring agents which can be used in the flavoring composition pepper, salt, cheese powder, cheese paste, onion powder, butter or butter buds, powdered au gratin seasonings, barbecue seasoning, paprika, vanilla extract, orange extract, sweeteners such as sugar and brown sugar, sesame seeds, sunflower seeds, ground crackers, ground up baked dough base, and ground potato chips. It is also contemplated that other nonseasoning ingredients may be incorporated into the flavor component such as colorants, other starches, fats or oils, and flour. Typically the flavor component will make up from about 60% to about 95% by weight of the topping composition. In a preferred embodiment the flavor component will make up from about 70% to about 85% of the topping composition.

A preferred topping can be described as one which is substantially dry by that we mean that the topping not contain more than about 20% moisture and preferably less than 16% moisture. A dry topping is more capable of absorbing the moisture from the high moisture dough base and it is believed that this moisture migration between the two layers results in a better fusing of the coating to the dough base.

The sequence of steps used in blending the topping composition is not critical. However steps should be taken to blend the topping such that a homogeneous mixture is obtained. When fluids or pastes are added, care should be taken to see that large lumps of material are avoided. In a preferred embodiment for example, cheese paste was blended first with the food starch for sufficient time to obtain a non-sticky dry paste before the addition of other ingredients.

The flour mixture used in preparing the dough base may be prepared from a wide variety of materials. The flour mixture may be selected from such materials as wheat flour, rye flour, oat flour, maize, soya flour, rice flour, corn grits, potato granules, potato flakes, tapioca, arrowroot and the like, the formulation of the dough base will vary depending upon the type of snack desired. However for commercial production of this product, it is desirable to combine two or more flours to produce the dough. Typically an all purpose wheat flour is combined with a tuberous root product. By tuberous root product we mean a product which is derived essentially from root type plants, which has been ground to an acceptable sieve size. Exemplary of this would be ingredients such as tapioca, potato, sago, waxy maize, waxy sorgum, white milo, sweet potato, arrow root, or mixtures of these. The tuberous product is present because of its ability to absorb greater amounts of water and still be capable of forming a workable dough. In a preferred embodiment of this invention the flour mixture used will contain between about 5% and up to about 60% by weight of a tuber ingredient based upon the total weight of the dough. A more preferred range for the tuber ingredient would be from about 15% to about 45% by weight. In a most preferred embodiment the tuber product used would be a potato product either in flour or flake form and would be used in the range of from about 20% to about 35% by weight of the total weight of the dough base.

The amount of moisture present in the dough base will typically be higher than would normally be found in the dough base of similar baked snack products. This high moisture level is needed to provide sufficient moisture to hydrate the film forming starch present in the topping composition. It is further believed that migration of the water from the high moisture dough base to the substantially dry film-forming topping, during the initial stages of the baking process, promotes a much tighter fusing between the two layers than would normally be expected. Yet the need for high moisture must be balanced against the necessity of being able to work and sheet the dough without it becoming overly sticky and fouling up the manufacturing equipment. The amount of moisture used will also be affected by the absorbing capacity of the ingredients used to make up the flour mixture as described in the above paragraph. For example if the dough base is made up primarily from a wheat flour i.e. from about 40% to about 55% wheat flour and only from about 5% to about 15% of a tuberous root product is used in the dough base then the moisture content of the dough base will preferably be from about 25% to about 35% base upon the total weight of the dough base. At the other end of the range if the dough base is made with only from about 5% to about 20% wheat flour and is primarily made with a tuberous root product, i.e. from about 30% to about 60% then the moisture content of the dough base will preferably be higher and be in the about 40% to about 65% range based upon the total weight of the dough base.

Many commercially available fats are suitable for use as a shortening in the dough base. These generally consist of animal or vegetable fats which may have been subjected to hydrogenation and are used to affect the rheology of the dough and to contribute to the tenderness of the final product. Examples of suitable fats are butter, margarine, lard, partially hydrogenated vegetable fats and so forth. A preferred shortening is lard.

It is also contemplated that in using this invention, other ingredients may be optimally added to the dough base. Included in this would be leavening agents, both yeast and/or chemical leavening agents, various salts, and preservatives. Salt is often used to flavor snack foods such as crackers.

Preservatives assist in maintaining the shelf life of the dough itself and prevent the spread of bacterial growth within the dough. Additional miscellaneous ingredients in making cracker-type snack products can be found in Matz, *Cookie and Cracker Technology*, The AVI Publishing Company, Inc., Westport Ct. (1968).

It is also contemplated that other various ingredients may be added for the purpose of flavoring and/or visually enhancing the final product. Furthermore, pieces of fruit or nuts may also be added to the composition described above for both the flavor they impart and the visual enhancement they bring. The size of the pieces added would be limited by the ability to machine the dough and apply the coating. However, it would be quite acceptable to incorporate bits of figs, cherries, raisins and so forth into the dough. The addition of small pieces of nuts such as sunflower seeds, sesame seeds, poppy seeds and so forth, both to the dough and/or the coating, is also contemplated.

In preparing the dough base no special precaution or procedure need be considered other than those that would be followed by one skilled in the art.

By using the procedure delineated below, a preferred embodiment of this novel snack product may be prepared. A dry particulate topping composition is prepared by blending the liquid or paste materials with a portion of the starch to obtain a non-sticky paste. To this was added to the rest of the starch and other powdery flavor ingredients to obtain a blended particulate topping. The mixing unit used for preparing the topping may be any mixer capable of providing sufficient mixing action. Units which have been used include a ribbon blender or a bower type mixer. Next a dough base is prepared by adding the flour ingredients, i.e. wheat flour and potato flakes, to a Hobart type mixer and, at a slow mixing speed, the flat and sugar are blended until a homogeneous mixture is obtained. The water is then slowly mixed into the dry ingredients until an acceptacle dough is obtained. Usually minor ingredients are separately mixed with a small portion of water and than slow added to the dough with mixing. The water may optionally be heated to an elevated temperature of usually between 120 degrees F. to about 180 degrees F. The use of heated water promotes formation of a workable dough. The dough base will then be sheeted using conventional commercial equipment to an acceptable thickness. The dough sheet will typically be substantially flat although it is contemplated that mechanically means may be used to deform the dough sheet. For example indentation may be made in the dough sheet to accent the curvature. The sheet will than be severed into individual pieces of acceptable size and shape. Although the invention may be practice by producing a narrow ribbon type sheet which has not been severed into individual pieces but rather scored at specific interval such that upon baking the ribbon could than be mechanically broken into individual pieces. Before sheeting and cutting, the dough may optionally be laminated.

Commercial cracker doughs, for example, are usually laminated. Laminating is the layering of a plurality of sheets which are about ½ inch thick, in a zigzag fashion over one another. A plurality of these layers, usually 2 to 4 sheets which together are about 1 to 2 inches in thickness, are fed to the reduction roller. During this process the dough is rolled into a sheet that is reduced in thickness by stages. For example, a batch of cracker dough can be initially rolled into a ½ inch sheet. This sheet is reduced to about ¼ inch thickness in the first reduction roll. The thickness of the sheet is then reduced again to about 1/16 inch in a gauge roll. After this final reduction in thickness the dough is ready for cutting into cracker shaped pieces or its final shape.

In a preferred embodiment where a cracker-type dough is used, it will be subjected to laminate before sheeting. The sheeted dough before coating will also typically be cut to the desired geometric design and then docked. Next the coating will be applied. Typically this will involve some kind of metered gravity feed which applies the topping to the dough sheet as it passes beneath. The ratio of topping to dough base will vary depending upon the amount of coating desired. Suitable products are produced when the amount topping composition applied is from about 5 lbs to about 15 lbs for every 100 lbs of unbaked dough base. After the dough sheet has been scored and the topping applied, the snack product is baked using standard baking temperatures and times. Typically the topped dough sheet is subjected to baking in a seven zone oven for about four minutes with a temperatures of between 400 degrees F. to 425 degrees F. in the first three zones using even heat from both top and bottom burners and at temperatures of about 320 degrees F. in the remaining four zones with the burners off. Although it is certainly contemplated that the dough sheet may be baked in an oven where the heat on the top and bottom of the dough sheet is varied.

The following examples are intended to further illustrate and explain the present invention but are not to be taken as limiting in any regard.

EXAMPLE I

This example describes the preparation of a preferred concave shaped baked snack wherein the topping imparts a cheese flavor to the snack. A cheese flavored topping composition was prepared from the following ingredients:

| Ingredients | Weight Percent |
| --- | --- |
| Cheese Paste | 19.35 |
| "FILM-SET" Food Starch | 19.35 |
| Toasted Onion Powder | 3.23 |
| Grated Parmesan Cheese | 38.71 |
| Spray Dried Cheddar Cheese | 19.35 |
| Total | 100.00 |

The cheese flavored topping composition was prepared by preblending the cheese paste and the food starch for sufficient time to obtain a non-sticky dry paste. To this is added, individually with mixing: (a) toasted onion powder, (b) grated parmesan cheese, and (c) spray dried cheddar cheese until small, dry, powdery granules are formed.

The dough base was prepared from the following ingredients:

| Ingredients | Weight Percent |
| --- | --- |
| Wheat Flour | 28.46 |
| Potato Flakes or Potato Flour | 25.38 |
| Fine Grained Sugar | 0.77 |
| Lard | 4.62 |
| Salt | 1.15 |
| Ammonium Carbonate | 1.92 |
| Water (160 degrees F.) | 37.69 |
| Optional Proteolytic Enzymes | 3 grams |
| Total | 100.00 |

A portion of the water, which has been heated to 160 degrees F., is mixed with the salt and sugar until the ingredients have been dissolved. This solution is then blended in with the flour, potato flakes and lard and mixing is continued. Optionally at this point the Proteolytic enzyme may be added with continued mixing. Ammonium carbonate dissolved in the remaining formula water is added. Mixing is continued for about 10 minutes at 30 RPM until the dough is a consistent mass. The dough was then laminated and sheeted. The sheet was then docked and scored sufficiently such that individual pieces were formed. The cheese flavored topping composition was then evenly distributed over the sheeted cracker dough using approximately 6 lbs of topping of topping to every 100 lbs of unbaked dough. The topped dough sheet was then subjected to baking in a seven zone oven for about four minutes with temperatures of between 400 degrees F. to 425 degrees F. in the first three zones using even heat from both top and bottom burners and at temperatures of about 320 degrees F. in the remaining four zones with the burners off. The baked snack produced was characterized by a substantially continuous cheese flavored topping which was tightly fused to the dough base. The product is shown in FIG. 1. It has a concave shape and the degree of curvature of 5 different pieces was measured all having a uniform curvature of about 22 degrees.

EXAMPLE II

This example describes the preparation of another concave shaped coated baked snack. The topping in this example has an onion flavor and the dough base contains a much smaller amount of a moisture absorbent potato flour. The flavored topping composition was prepared from the following ingredients.

| Ingredients | Weight Percent |
| --- | --- |
| Salt | 4.5 |
| Onion Powder | 1.0 |
| Black Pepper | 0.5 |
| "FILM-SET" food starch | 16.0 |
| Other Starch | 20.0 |
| Cracker crumbs | 51.0 |
| Toasted Onion Powder | 3.0 |
| Total | 100.0 |

The salt, onion, black pepper, and toasted onion powder were slowly blended into the combined food starches until a fairly homogeneous mixture was obtained. The dough base was prepared from the following ingredients:

| Ingredients | Weight Percent |
| --- | --- |
| Wheat Flour | 51.0 |
| Potato Flour | 8.0 |
| Sugar | 1.0 |
| Lard | 5.0 |
| Salt | 1.15 |
| Ammonium Carbonate | 1.92 |
| Water | 32.0 |
| Total | 100.00 |

The dough was made up in a manner similar to that described in Example I. Upon baking, a curve shaped golden brown onion flavored cracker was produced.

EXAMPLE III

This example illustrates the preparation of another coated baked concave snack product according to the present invention. The details of the procedure were the same as in example I. The only difference is that the snack prepared herein is characterized by a cracker flavor. The flavor component of the topping is primarily made from the dough base described below which has been baked and comminuted to an appropriate particulate size. The use of comminuted baked dough base results in a concave shaped snack which is perceived as being unflavored.

| Ingredients | Weight Percent |
| --- | --- |
| Salt | 4.5 |
| Comminuted Baked Dough Base | 63.0 |
| Black Pepper | 0.5 |
| "FIIM-SET" Food Starch | 32.0 |
| Total | 100.0 |

The dough base was prepared from the following ingredients:

| Ingredients | Weight Percent |
| --- | --- |
| Wheat Flour | 28.46 |
| Potato Flakes or Potato Flour | 25.38 |
| Fine Grained Sugar | 0.77 |
| Lard | 4.62 |

-continued

| Ingredients | Weight Percent |
| --- | --- |
| Salt | 1.15 |
| Ammonium Carbonate | 1.92 |
| Water (160 degrees F.) | 37.69 |
| Optional Proteolytic Enzymes | 3 grams |
| Total | 100.00 |

The product produced had a homogeneous cracker flavor and concave shape.

EXAMPLE IV

This example describes the preparation of another concave shaped coated baked snack. The topping in this example has an onion/sesame seed flavor and the dough base has incorporated into it sesame seeds. The flavored topping composition was prepared from the following ingredients.

| Ingredients | Weight Percent |
| --- | --- |
| Salt | 4.5 |
| Onion Powder | 1.0 |
| Black Pepper | 0.5 |
| "FILM-SET" food starch | 40.0 |
| Ground Sesame Seeds | 9.0 |
| Cracker Crumbs | 41.0 |
| Toasted Onion Powder | 3.0 |
| Total | 100.0 |

The dough base was prepared from the following ingredients:

| Ingredients | Weight Percent |
| --- | --- |
| Wheat Flour | 26.46 |
| Potato Flakes or Potato Flour | 21.38 |
| Sesame Seeds | 9.0 |
| Fine Grained Sugar | 0.77 |
| Lard | 4.62 |
| Salt | 1.15 |
| Ammonium Carbonate | 1.92 |
| Water (160 degrees F.) | 34.69 |
| Optional Proteolytic Enzymes | 3 grams |
| Total | 100.00 |

The product produced has a pleasant sesame seed flavor and characteristic concave shape.

What is claimed is:

1. A snack food made from a dough base which has been coated on one surface with a particulate topping composition, which upon baking yields a concave shaped snack food coated with a fused, substantially continuous film topping wherein the dough base comprises a flour mixture, shortening, and water; and the topping composition comprises a film-forming food starch capable of being hydrated and gelatinized during baking to form the continuous film topping inhibiting moisture loss from the coated side of the dough base and a flavor component.

2. A snack food according to claim 1 wherein the flour mixture comprises a member selected from the group consisting of wheat, rye, oat, maize, soya, rice, corn, potato, tapioca, arrowroot, and mixtures of these.

3. A snack food according to claim 2 wherein the dough base comprises at least about 5% to about 60% by weight of a tuberous root product based upon the total weight of the dough base.

4. A snack food according to claim 1 wherein the film-forming food starch is a modified waxy maize corn starch.

5. A snack according to claim 1 wherein the flavor component in the topping composition contains cheese solids and at least one other seasoning ingredient.

6. A snack food according to claim 1 wherein the topping composition is made up of from about 5% to about 40% by weight of the film-forming food starch and from about 60% to about 95% by weight of the flavor component based upon the total weight of the topping composition.

7. A snack food according to claim 1 wherein the dough base has a moisture content of from about 20% to about 70% by weight based upon the total weight of the dough base.

8. A snack food according to claim 1 wherein the dough base comprises from about 40% to about 55% of a wheat flour and from about 5% to about 15% of a tuberous root product and a moisture content of from about 25% to about 35% based upon the total weight of the dough base.

9. A snack food according to claim 1 wherein the dough base comprises from about 5% to about 20% of a wheat flour and from about 30% to about 60% of a tuberous root product and a moisture content of from about 40% to 65% based upon the total weight of the dough base.

10. A snack food according to claim 1 wherein after baking the dough base has a thickness of about 0.05 mm to about 3.0 mm and the topping has a thickness of from about 0.005 mm to about 1 mm.

11. A snack food according to claim 1 wherein after baking the curvature of the snack is from about 10 degrees of about 45 degrees.

12. A snack food made from a dough base which has been coated on one surface with a substantially dry particulate topping composition whereupon baking the topping becomes hydrated by the moisture from the dough base and is fused to the expanding dough base to form a continuous moisture resistant barrier to inhibit moisture loss through the coated surface of the dough base during baking resulting in a concave shaped snack food coated with a tightly fused, substantially continuous topping wherein the dough base comprises a flour mixture, shortening, and has a moisture content of from about 25% to about 65% by weight based upon the total weight of the dough base; and the topping composition comprises a hydratable, moisture barrier film-forming food starch and a flavor component.

13. A snack food according to claim 12 wherein the film-forming food starch is a modified waxy maize corn starch.

14. A snack food according to claim 12 wherein the topping composition is made up of from about 5% to about 40% by weight of the film-forming food starch and from about 60% to about 95% by weight of the flavor component based upon the total weight of the topping composition.

15. A snack food according to claim 12 wherein the dough base comprises from about 40% to about 55% of a wheat flour and from about 5% to about 15% of a tuberious root product and a moisture content of from about 25% to about 35% based upon the total weight of the dough base.

16. A snack food according to claim 12 wherein the dough base comprises from about 5% to about 20% of a wheat flour and from about 30% to about 60% of a tuberous root product and a moisture content of from about 40% to 65% based upon the total weight of the dough base.

17. A process for preparing a snack food comprising:
 (a) preparing a substantially dry particulate topping composition by blending a film-forming food starch and a flavor component;
 (b) preparing a dough base by blending a flour mixture, shortening, and water to form a dough;
 (c) sheeting the dough;
 (d) coating one side of the sheeted dough with the blended particulate topping composition;
 (e) baking the coated dough base at a high enough temperature, and for a sufficient time period such that the coated topping composition hydrates and fuses to the dough base to form a continuous moisture resistant barrier thereby inhibiting moisture loss through the coated side during baking causing the dough base to deform into a concave shaped snack product.

18. The process of claim 17 wherein the flour mixture comprises a member selected from the group consisting of wheat, rye, oat, maize, soya, rice corn, potato, tapioca, arrowroot, and mixtures of these.

19. The process of claim 17 wherein the dough base comprises at least about 5% to about 60% by weight of a tuberous root product based upon the total weight of the dough base.

20. The process of claim 17 wherein the film-forming food starch is a modified waxy maize corn starch.

21. The process of claim 17 wherein the topping composition is made up of from about 5% to about 40% by weight of the film-forming food starch and from about 60% to about 95% by weight of the flavor component based upon the total weight of the topping composition.

22. The process of claim 17 wherein the dough base has a moisture content of from about 20% to about 70% by weight based upon the total weight of the dough base.

23. The process of claim 17 wherein the dough base comprises from about 40% to about 55% of a wheat flour and from about 5% to about 15% of a tuberious root product and a moisture content of from about 25% to about 35% based upon the total weight of the dough base.

24. The process of claim 17 wherein the dough base comprises from about 5% to about 20% of wheat flour and from about 30% to about 60% of a tuberious root product and a moisture content of from about 40% to 65% based upon the total weight of the dough base.

25. The process of claim 17 wherein the sheeted dough is cut into individual pieces before baking.

26. The process of claim 17 wherein after baking, the dough base has a thickness of about 0.05 mm to about 3.0 mm and the topping has a thickness of from about 0.005 mm to about 1 mm.

27. The process of claim 17 wherein after baking, the curvature of the snack is from about 10 degrees to about 45 degrees.

28. The process of claim 17 wherein after baking, the curvature of the snack is from about 15 degrees to about 35 degrees.

29. The process of claim 17 wherein after baking the snack has a moisture content of from about 1.5% to about 6% by weight.

30. A snack food product produced by the process of claim 17.

31. A process for preparing a snack food comprising:
 (a) preparing a substantially dry particulate topping composition by blending a hydratable, moisture barrier film-forming food starch and a flavor component;
 (b) preparing a dough base by blending a flour mixture, shortening, and water to form a dough with a moisture content of from about 25% to about 65% by weight based upon the total weight of the dough base;
 (c) sheeting and cutting the dough sheet into individual pieces;
 (d) coating one side of the sheeted and cut dough with the blended particulate topping composition;
 (e) baking the coated dough base at a high enough temperature, and for a sufficient time period such that the topping becomes hydrated and fused to the expanding dough base to form a continuous moisture resistant barrier to inhibit moisture loss through the coated side of the dough base during baking resulting in a concave shaped snack food coated with a tightly fused, substantially continuous topping.

32. The process of claim 31 wherein the dough base comprises at least about 5% to about 60% by weight of a tuberous root product based upon the total weight of the dough base.

33. The process of claim 31 wherein the film-forming food starch is a modified waxy maize corn starch.

34. The process of claim 31 wherein the topping composition is made up of from about 5% to about 40% by weight of the film-forming food starch and from about 60% to about 95% by weight of the flavor component based upon the total weight of the topping composition.

35. The process of claim 31 wherein after baking, the dough base has a thickness of about 0.05 mm to about 3.0 mm and the topping has a thickness of from about 0.005 mm to about 1 mm.

36. The process of claim 31 wherein after baking, the curvature of the snack is from about 10 degrees to about 45 degrees.

37. The process of claim 31 wherein after baking, the curvature of the snack is from about 15 degrees to about 35 degrees.

38. A snack food product produced by the process of claim 31.

39. The snack food of claim 1 wherein the particulate topping composition has a moisture content of 20% by weight or less before baking.

40. The snack food of claim 39 wherein the particulate topping composition has a moisture content of less than about 16% by weight before baking.

41. The snack food of claim 1 wherein the dough base includes moisture in an amount sufficient to hydrate the particulate topping composition during baking.

42. The snack food of claim 12 wherein the particulate topping composition has a moisture content of less than about 20% by weight before baking.

43. The snack food of claim 12 wherein particulate topping composition has a moisture content of less than about 16% by weight before baking.

44. The process of claim 17 wherein the particulate topping composition has a moisture content of less than of about 20% by weight before baking.

45. The process of claim 42 wherein the particulate topping composition has a moisture content of less than about 16% by weight before baking.

46. The process of claim 17 further including the step of selecting a film-forming food starch capable of hydration upon baking by absorbing moisture from a coated dough base and forming a substantially continuous moisture barrier to resist moisture loss through the coated surface of the dough base.

47. The process of claim 17 comprising preparing the dough base with sufficient moisture to hydrate the particulate topping composition during baking.

48. The process of claim 31 wherein the particulate topping composition has a moisture content of less than about 16% by weight before baking.

49. The process of claim 31 wherein the particulate topping composition has a moisture content of about 20% by weight before cooking.

50. The process of claim 31 comprising preparing the dough with sufficient moisture to hydrate the particulate topping compositions during baking.

* * * * *